(12) United States Patent
Kim

(10) Patent No.: US 11,190,077 B2
(45) Date of Patent: Nov. 30, 2021

(54) MOTOR

(71) Applicant: LG INNOTEK CO., LTD., Seoul (KR)

(72) Inventor: Yong Joo Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/477,018

(22) PCT Filed: Jan. 11, 2018

(86) PCT No.: PCT/KR2018/000520
§ 371 (c)(1),
(2) Date: Jul. 10, 2019

(87) PCT Pub. No.: WO2018/131905
PCT Pub. Date: Jul. 19, 2018

(65) Prior Publication Data
US 2019/0363605 A1 Nov. 28, 2019

(30) Foreign Application Priority Data

Jan. 11, 2017 (KR) .................. 10-2017-0004207
Jan. 13, 2017 (KR) .................. 10-2017-0005932

(51) Int. Cl.
*H02K 5/16* (2006.01)
*H02K 5/10* (2006.01)
(Continued)

(52) U.S. Cl.
CPC .............. *H02K 5/16* (2013.01); *H02K 5/10* (2013.01); *H02K 5/1732* (2013.01); *H02K 5/225* (2013.01);
(Continued)

(58) Field of Classification Search
CPC .......... H02K 5/16; H02K 5/161; H02K 5/163; H02K 5/165; H02K 5/167; H02K 5/1672;
(Continued)

(56) References Cited

U.S. PATENT DOCUMENTS 5,138,209 A * 8/1992 Chuta ................ G11B 19/2009
310/51
6,053,638 A * 4/2000 Muraki ................... F16C 27/04
384/513
(Continued)

FOREIGN PATENT DOCUMENTS

CN 106253552 A 12/2016
EP 1 172 919 A2 1/2002
(Continued)

OTHER PUBLICATIONS

Kong Bong Bae, Motor for Electric Power Steering, Jul. 22, 2009, LG Innotek, KR 20090079350 (English Machine Translation) (Year: 2009).*

(Continued)

*Primary Examiner* — Quyen P Leung
*Assistant Examiner* — Alexander A Singh
(74) *Attorney, Agent, or Firm* — Saliwanchik, Lloyd & Eisenschenk

(57) ABSTRACT

The present invention may provide a motor comprising: a rotation shaft; a rotor including a coupling hole in which the rotation shaft is disposed; a stator disposed outside the rotor; and a housing for receiving the rotor and the stator, wherein the housing comprises: a body; a bracket disposed on one side of the body and including a hole and a bearing pocket part disposed along the circumferential direction with respect to the center of the hole; and a bearing disposed in the bearing pocket part, wherein the inner surface of the bearing pocket part includes a first surface, a second surface, and a third surface, and wherein the first surface comes in contact with the outer circumferential surface of the bearing, the second surface comes in contact with the upper surface of the bearing, and the third surface is disposed between the first surface and the second surface in the height direction of (Continued)

the bracket while being spaced apart from the outer circumferential surface of the bearing.

16 Claims, 13 Drawing Sheets

(51) Int. Cl.
| | |
|---|---|
| *H02K 5/24* | (2006.01) |
| *H02K 11/215* | (2016.01) |
| *H02K 5/173* | (2006.01) |
| *H02K 5/22* | (2006.01) |
| *H02K 7/00* | (2006.01) |
| *B62D 5/04* | (2006.01) |
| *F16C 35/06* | (2006.01) |

(52) U.S. Cl.
CPC ............... *H02K 5/24* (2013.01); *H02K 7/003* (2013.01); *H02K 11/215* (2016.01); *B62D 5/0403* (2013.01); *F16C 35/06* (2013.01); *F16C 2326/24* (2013.01)

(58) Field of Classification Search
CPC .. H02K 5/1675; H02K 5/1677; H02K 5/1732; H02K 5/10; H02K 5/225; H02K 7/003; H02K 11/215; H02K 5/24; H02K 5/04; H02K 5/1735; H02K 7/08; F35C 35/06; F35C 35/07; F35C 35/077; B62D 5/0403; F16C 2326/24
USPC ..................................................... 310/89, 90
See application file for complete search history.

(56) References Cited

U.S. PATENT DOCUMENTS

| | | | |
|---|---|---|---|
| 9,172,285 B2 | 10/2015 | Won | |
| 2006/0017341 A1* | 1/2006 | Hahn | H02K 5/00 310/91 |
| 2008/0056633 A1 | 3/2008 | Stout et al. | |
| 2008/0073988 A1* | 3/2008 | Kataoka | H02K 3/522 310/71 |
| 2010/0132186 A1* | 6/2010 | Hargraves | H02K 5/1732 29/598 |
| 2011/0285233 A1* | 11/2011 | Singhal | H02K 7/09 310/90.5 |
| 2012/0134609 A1* | 5/2012 | Kim | F16C 35/067 384/91 |
| 2016/0359389 A1 | 12/2016 | Kim | |
| 2017/0201152 A1* | 7/2017 | Haga | H02K 5/1732 |

FOREIGN PATENT DOCUMENTS

| | | | |
|---|---|---|---|
| EP | 3 006 758 A1 | | 4/2016 |
| JP | 3063398 B2 | | 7/2000 |
| JP | 2016-142401 A | | 8/2016 |
| KR | 20090079350 A | * | 7/2009 |
| KR | 10-2015-0106980 A | | 9/2015 |
| KR | 10-2016-0143925 A | | 12/2016 |

OTHER PUBLICATIONS

International Search Report dated Apr. 19, 2018 in International Application No. PCT/KR2018/000520.
Office Action dated Apr. 2, 2021 in Chinese Application No. 201880006641.1.
Supplementary Partial European Search Report dated Apr. 6, 2021 in European Application No. 18739137.0.

* cited by examiner

MOTOR

CROSS-REFERENCE TO RELATED APPLICATIONS

This application is the U.S. national stage application of International Patent Application No. PCT/KR2018/000520, filed Jan. 11, 2018, which claims the benefit under 35 U.S.C. § 119 of Korean Application Nos. 10-2017-0004207, filed Jan. 11, 2017; and 10-2017-0005932, filed Jan. 13, 2017; the disclosures of each of which are incorporated herein by reference in their entirety.

TECHNICAL FIELD

An embodiment relates to a motor.

BACKGROUND ART

Electric power steering (EPS) is a device that allows a driver to safely drive by ensuring turning stability of a vehicle and providing a rapid restoring force. Such an EPS controls driving of a steering shaft of a vehicle by driving a motor through an electronic control unit (ECU) according to traveling conditions detected by a vehicle speed sensor, a torque angle sensor, a torque sensor, and the like.

A rotation shaft of the motor is supported by a bearing. The bearing may be received in a bearing pocket part of a housing. In addition, the bearing may be fixed to the bearing pocket part by caulking. In this case, a part of a bracket is caulked to press the bearing so that the bearing may be fixed to the bearing pocket part.

However, when the bracket is caulked, there is a great risk that the bracket is deformed. Generally, the bracket is formed of aluminum, and when an external pressure is applied around the bearing pocket part for the caulking, the bearing pocket part may be deformed. When the bearing pocket part is deformed, fixing strengths of upper and lower ends of the bearing may become different from each other such that noise and annoying sounds may be generated.

In addition, the motor is connected to a steering apparatus of the vehicle so as to transmit power. In this case, there is a column-type EPS in which the motor is connected to the steering shaft. In the case of the column type EPS, it is easy to secure a mounting space in the vehicle, but the noise of the motor may become problematic because a position of the motor is close to a driver's seat. Particularly, when vibrations occur in the steering shaft, the generated vibrations are directly transmitted to the motor so that a large amount of noise may be generated in the motor.

DISCLOSURE

Technical Problem

Therefore, in order to solve the above problems, an embodiment is directed to providing a motor in which a bearing pocket part may be inhibited from being deformed when a bearing is caulked to the bearing pocket part.

In addition, an embodiment is directed to providing a motor in which vibrations generated in a steering shaft may be inhibited from being transmitted to the motor.

Technical Solution

In order to achieve the above objects, one aspect of the present invention provides a motor including a rotation shaft, a rotor including a coupling hole in which the rotation shaft is disposed, a stator disposed outside the rotor, and a housing configured to receive the rotor and the stator, wherein the housing includes a body a bracket disposed on one side of the body and including a hole and a bearing pocket part disposed along a circumferential direction about a center of the hole, and a bearing disposed in the bearing pocket part. An inner surface of the bearing pocket part includes a first surface, a second surface, and a third surface. The first surface comes into contact with an outer circumferential surface of the bearing, the second surface comes into contact with an upper surface of the bearing, and the third surface is disposed between the first surface and the second surface in a height direction of the bracket while being spaced apart from the outer circumferential surface of the bearing.

The bearing pocket part may include a lower inner diameter portion connected to a lower surface of the bearing pocket part, and an upper inner diameter portion connected to an upper surface of the bearing pocket part and having an inner diameter greater than an inner diameter of the lower inner diameter portion, and a sum of a height of the lower inner diameter portion and a height of the upper inner diameter portion may be greater than a height of the bearing based on the lower surface of the bearing pocket part and may be smaller than a height of the upper surface of the bearing pocket part based on the lower surface of the bearing pocket part.

In order to achieve the above objects, another aspect of the present invention provides a motor including a rotation shaft, a rotor including a coupling hole in which the rotation shaft is disposed, a stator disposed outside the rotor, and a housing configured to receive the rotor and the stator, wherein the housing includes a body, a bracket disposed on one side of the body and including a hole and a bearing pocket part disposed along a circumferential direction about a center of the hole, and a bearing disposed in the bearing pocket part. The bearing pocket part includes a lower inner diameter portion connected to a lower surface of the bearing pocket part, and an upper inner diameter portion connected to an upper surface of the bearing pocket part and having an inner diameter greater than an inner diameter of the lower inner diameter portion, and a sum of a height of the lower inner diameter portion and a height of the upper inner diameter portion is greater than a height of the bearing based on the lower surface of the bearing pocket part and is smaller than a height of the upper surface of the bearing pocket part based on the lower surface of the bearing pocket part.

An inner surface of the bearing pocket part may include a first surface, a second surface, and a third surface. The first surface may come into contact with an outer circumferential surface of the bearing, the second surface may come into contact with an upper surface of the bearing, and the third surface may be disposed between the first surface and the second surface in a height direction of the bracket while being spaced apart from the outer circumferential surface of the bearing.

The bracket may include a guide protruding from an upper surface of the bracket and radially symmetrical about the center of the hole.

The guide may include an inclined surface disposed at an upper end of the guide.

The guide may be annularly disposed along a circumferential direction about the center of the hole.

The bracket may include a fastening part including a fastening hole.

The bracket may include a coupler pocket part disposed on an upper side of the bearing pocket part, recessed in an upper surface of the bracket, and having an inner diameter greater than an inner diameter of the bearing pocket part.

Advantageous Effects

According to an embodiment, when caulking for fixing a bearing is performed, a bearing pocket part can be inhibited from being deformed so that an advantageous effect of inhibiting noise and annoying sounds from being generated can be obtained.

According to an embodiment, the deformation due to the caulking is inhibited from occurring in a bracket in which a coupler pocket part is disposed on the upper side of the bearing pocket part so that an advantageous effect of further inhibiting the noise and annoying sounds from being generated can be obtained.

According to an embodiment, a guide coming into contact with a steering apparatus is provided on an upper surface of a housing of a motor to increase coupling strength between the motor and the steering apparatus so that an advantageous effect of reducing generation of vibrations can be obtained.

According to an embodiment, a damper coming into contact with the steering apparatus is provided on the upper surface of the housing of the motor so that an advantageous effect of reducing the vibrations transmitted from the steering apparatus can be obtained.

MODES OF THE INVENTION

Hereinafter, exemplary embodiments of the present invention will be described in detail with reference to the accompanying drawings. The objects, specific advantages, and novel features of the present invention will become more apparent from the following detailed description and exemplary embodiments taken in conjunction with the accompanying drawings. In addition, the terms and words used in the present specification and claims should not be construed as being limited to ordinary or dictionary meanings but should be construed as being meanings and concepts commensurate with the technical idea of the present invention based on the principle that the inventor may appropriately define the concept of the term in order to explain his/her invention in the best way. Further, throughout the description of the present invention, detailed descriptions of a certain relevant conventional technology will be omitted when they make the subject matter of the present invention rather unclear.

Figure 1:
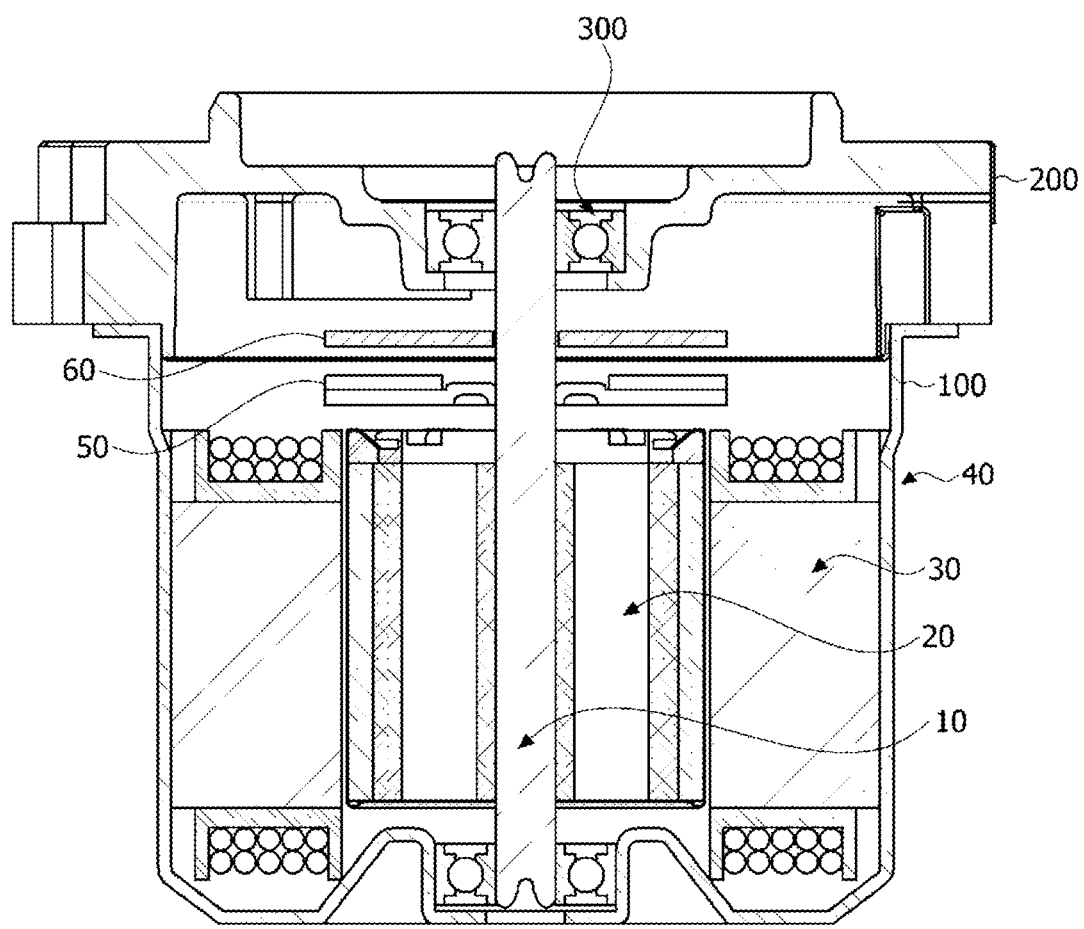
FIG. 1 is a view illustrating a motor according to an embodiment.

FIG. 1 is a view illustrating a motor according to an embodiment.

Referring to FIG. 1, the motor according to the embodiment may include a rotation shaft 10, a rotor 20, a stator 30, and a housing 40.

The rotation shaft 10 may be coupled to the rotor 20. When electromagnetic interaction between the rotor 20 and the stator 30 occurs through supply of a current, the rotor 20 rotates and then the rotation shaft 10 is rotated. The rotation shaft 10 may be connected to a steering shaft of a vehicle to transmit power to the steering shaft.

The rotor 20 is configured to rotate through electrical interaction with the stator 30.

The rotor 20 may include a rotor core and a magnet. The rotor core may be implemented in a configuration in which a plurality of circular thin steel plates are laminated or may be implemented in the form of a single cylinder. The rotor core may be formed at a center thereof with a coupling hole to which the rotation shaft 10 is coupled. A protrusion configured to guide the magnet may protrude from an outer circumferential surface of the rotor core. The magnet may be attached to the outer circumferential surface of the rotor core. A plurality of magnets may be arranged along a circumference of the rotor core at regular intervals. The rotor 20 may include a can member configured to surround the magnet to fix the magnet such that the magnet is inhibited from being separated from the rotor core and configured to inhibit the magnet from being exposed.

In the stator 30, a coil may be wound to cause the electrical interaction with the rotor 20. A specific configuration of the stator 30 to wind the coil is provided as follows. The stator 30 may include a stator core including a plurality of teeth. In the stator core, an annular yoke part may be provided, and the teeth around which the coil is wound may be provided in a central direction of a yoke. The teeth may be provided at regular intervals along an outer circumferential surface of the yoke part. Meanwhile, the stator core may be formed by laminating a plurality of thin steel plates. In addition, the stator core may be formed by coupling or connecting a plurality of split cores to each other.

The rotor 20 and the stator 30 may be accommodated inside the housing 40. The housing 40 may include a body 100 and a bracket 200.

The body 100 has a cylindrical shape. In addition, the body 100 has an open top. The bracket 200 is configured to cover the open top of the body 100. The stator 30 may be disposed inside the body 100, and the rotor 20 may be disposed inside the stator 30.

A sensing magnet 50 is a device coupled to the rotation shaft 10 to interlock with the rotor 20 and configured to detect a position of the rotor 10.

A sensor configured to detect a magnetic force of the sensing magnet 50 may be provided on a printed circuit board 60. In this case, the sensor may be a Hall integrated circuit (IC). The sensor is configured to detect changes of N and S poles of the sensing magnet 50 to generate a sensing signal.

Figure 2:
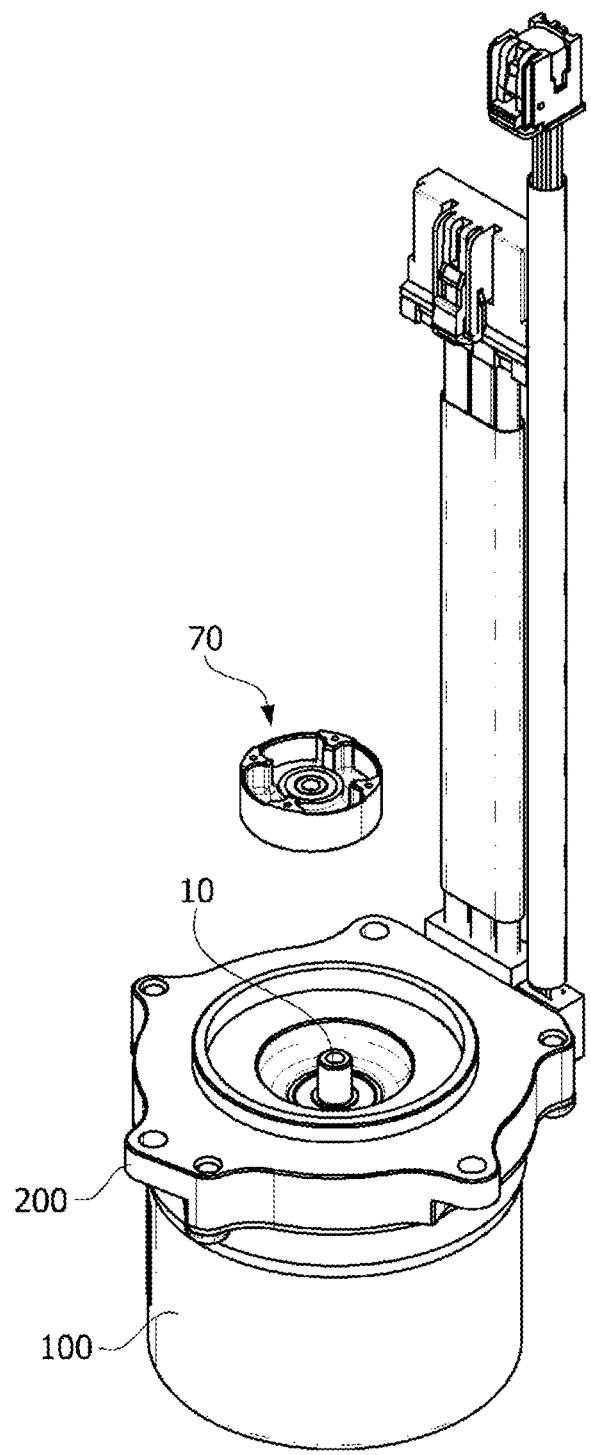
FIG. 2 is a view illustrating a coupler coupled to a rotation shaft shown in FIG. 1.

FIG. 2 is a view illustrating a coupler coupled to a rotation shaft shown in FIG. 1.

Referring to FIGS. 1 and 2, a bearing 300 is configured to rotatably support the rotation shaft 10. A coupler 70 is coupled to an end of the rotation shaft 10. When the rotation shaft 10 rotates, the coupler 70 is rotated together with the rotation shaft 10. The coupler 70 is connected to a coupler (not shown) of the steering apparatus to transmit a rotational force of the motor to the steering apparatus.

Figure 3:
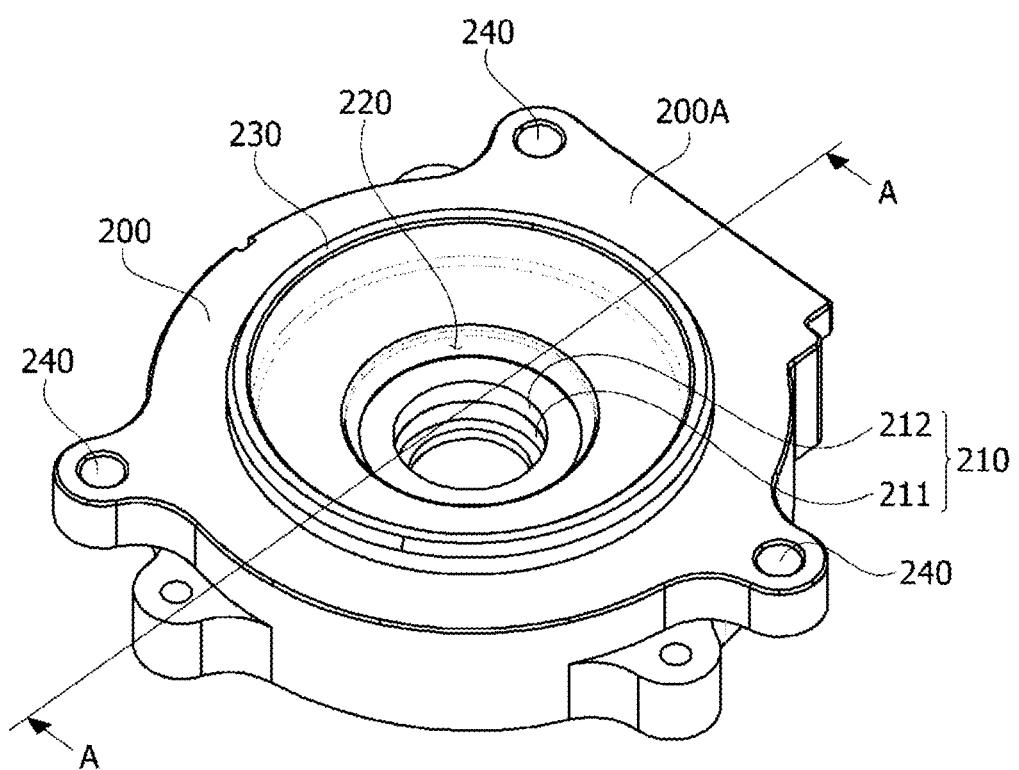
FIG. 3 is a view illustrating a bracket according to the embodiment.
Figure 4:
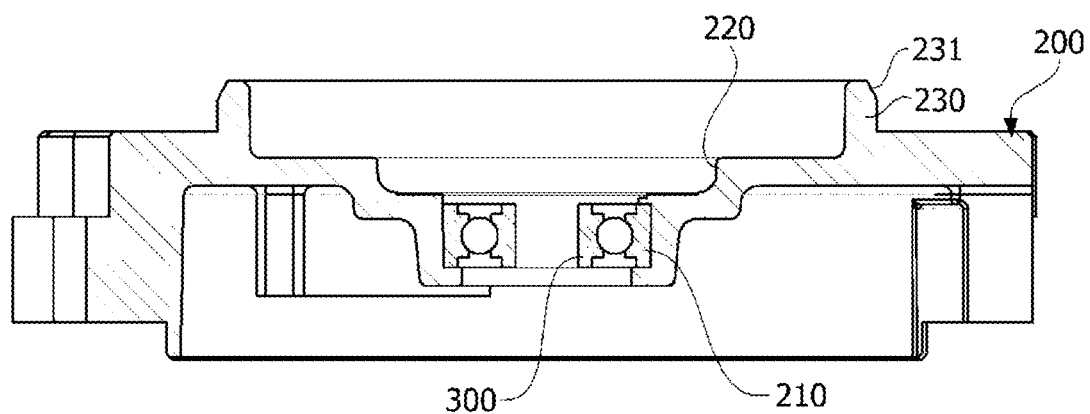
FIG. 4 is a sectional view of the bracket taken along line A-A' of FIG. 3.

FIG. 3 is a view illustrating a bracket according to the embodiment, and FIG. 4 is a sectional view of the bracket taken along line A-A' of FIG. 3.

Referring to FIGS. 3 and 4, the bracket 200 may include a bearing pocket part 210 configured to receive the bearing (300 in FIG. 1). A hole 1 may be disposed at a center of the bracket 200, and the bearing pocket part 210 may be disposed along a circumference of the hole. The bearing pocket part 210 is recessed in an upper surface 200A of the bracket 200 and includes a space configured to receive the bearing (300 in FIG. 1).

The bracket 200 may include a coupler pocket part 220 configured to receive the coupler (70 in FIG. 2). The coupler pocket part 220 is disposed on an upper side of the bearing pocket part 210. An inner diameter of the coupler pocket part 220 may be greater than an inner diameter of the bearing pocket part 210. The coupler pocket part 220 may be recessed in the upper surface 200A of the bracket 200.

When the motor is coupled with the steering apparatus, the upper surface 200A of the bracket 200 comes into contact with the steering apparatus. Therefore, when vibrations are generated in the steering apparatus, the generated vibrations are transmitted to the motor through the upper surface 200A of the bracket 200. In order to reduce the vibrations transmitted to the motor from the steering apparatus, a guide 230 may protrude from the upper surface 200A of the bracket 200 according to the embodiment.

The guide 230 is press-fitted into a coupling portion of the steering apparatus to increase coupling strength between the motor and the steering apparatus so that the vibrations may be inhibited from being generated due to a clearance of a fastening part 240. The guide 230 may be radially symmetrical about the hole 1 of the bracket 200 on the upper surface 200A of the bracket 200. For example, the guide 230 may be annularly disposed along a circumference of the hole 1 of the bracket 200. Although the guide 230 is shown in an annular shape in the drawing, a plurality of block-shaped guides 230 may be provided.

An upper end of the guide 230 may include an inclined surface 231. In detail, an upper end of an outer circumferential surface of the guide 230 may be cut to form the inclined surface 231. The inclined surface 231 is formed to facilitate the press-fitting into the coupling portion of the steering apparatus.

The bracket 200 may include the fastening part 240. The fastening part 240 is provided for physical coupling with the steering apparatus. The fastening part 240 may extend and protrude from a side surface of the bracket 200. A plurality of fastening parts 240 may be provided.

Figure 5:
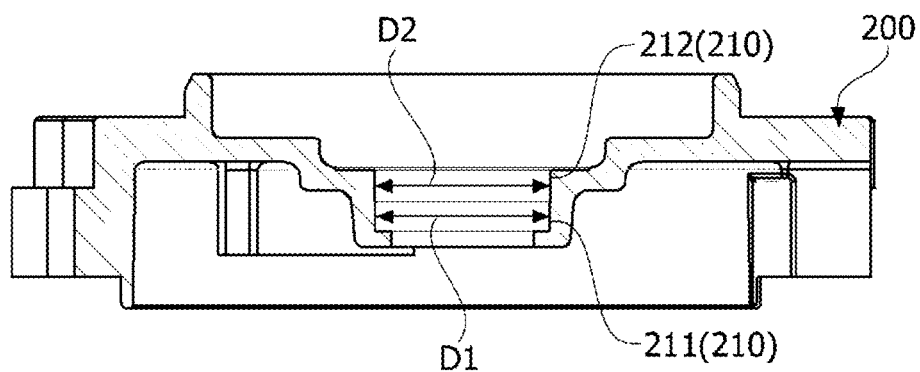
FIG. 5 is a view illustrating a bearing pocket part.
Figure 6:
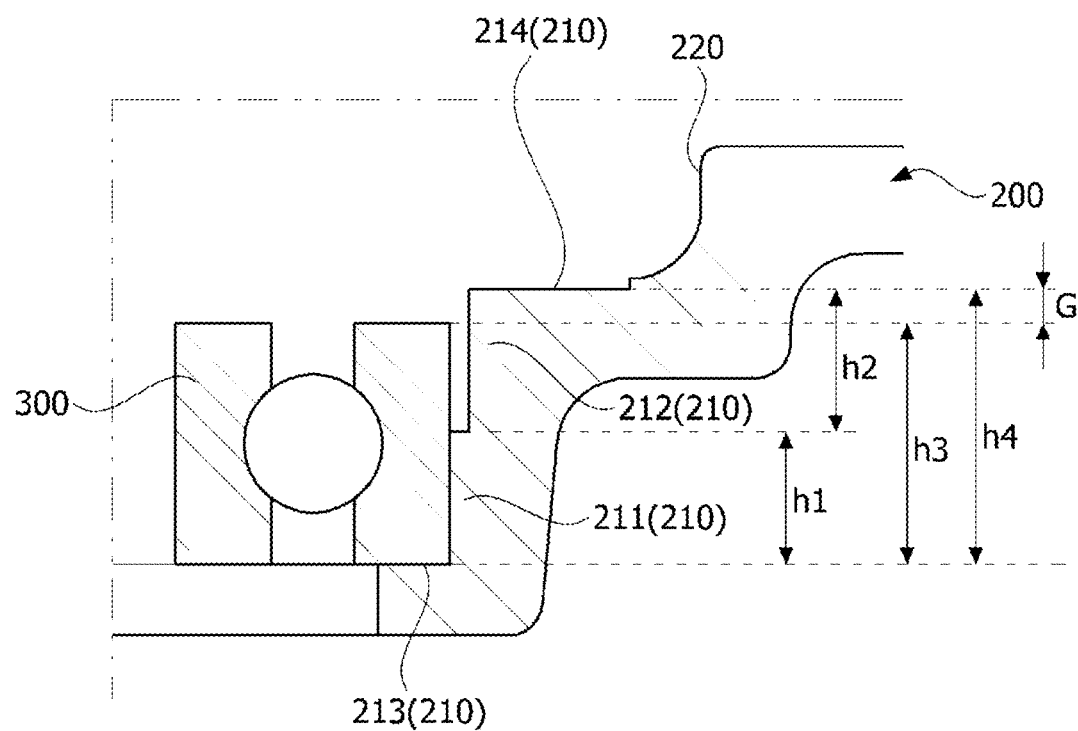
FIG. 6 is a view illustrating a lower inner diameter portion and an upper inner diameter portion of the bearing pocket part.

FIG. 5 is a view illustrating a bearing pocket part, and FIG. 6 is a view illustrating a lower inner diameter portion and an upper inner diameter portion of the bearing pocket part.

Referring to FIGS. 5 and 6, the bearing pocket part 210 may include a lower inner diameter portion 211 and an upper inner diameter portion 212.

The lower inner diameter portion 211 is connected to a lower surface 213 of the bearing pocket part 210. The upper inner diameter portion 212 is connected to an upper surface 214 of the bearing pocket part 210. An inner diameter D2 of the upper inner diameter portion 212 is greater than an inner diameter D1 of the lower inner diameter portion 211. The lower inner diameter portion 211 comes into contact with an outer ring of the bearing 300. Meanwhile, the upper inner diameter portion 212 is spaced apart from the outer ring of the bearing 300.

Meanwhile, when measured from the lower surface 213 of the bearing pocket part 210, the sum of a height h1 of the lower inner diameter portion 211 and a height h2 of the upper inner diameter portion 212 is greater than a height h3 of the bearing 300. In addition, when measured from the lower surface 213 of the bearing pocket part 210, the sum of the height h1 of the lower inner diameter portion 211 and the height h2 of the upper inner diameter portion 212 may at least be smaller than a height h4 of the upper surface 214 of the bearing pocket part 210. Therefore, when the bearing 300 is received in the bearing pocket part 210, the upper surface 214 of the bearing pocket part 210 is positioned higher than an upper surface of the bearing 300 by a height of G shown in FIG. 6. This configuration is provided to secure an area to be caulked to the bearing 300 in the bracket 200.

Figure 7:
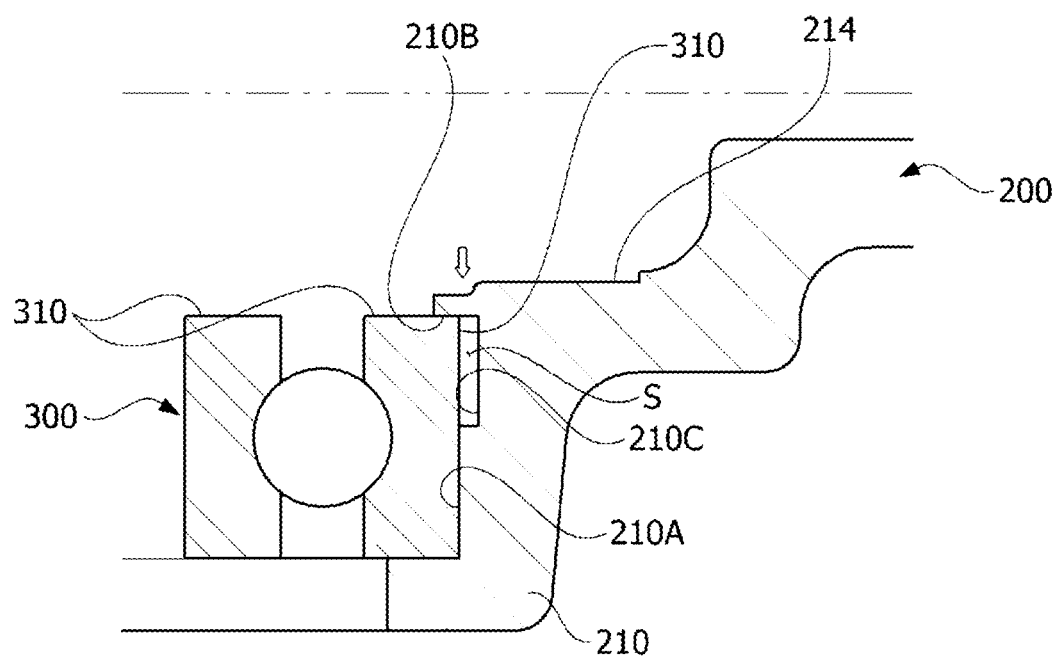
FIG. 7 is a view illustrating a state in which a bearing is fixed to the bearing pocket part after caulking.

FIG. 7 is a view illustrating a state in which a bearing is fixed to the bearing pocket part after caulking.

Referring to FIG. 7, after the caulking, an inner surface of the bearing pocket part 210 may include a first surface 210A, a second surface 210B, and a third surface 210C. The first surface 210A is disposed on the lower inner diameter portion 211 and is a surface that comes into contact with an outer circumferential surface of the outer ring of the bearing 300. In addition, the second surface 210B is disposed on the upper inner diameter portion 212 and is a surface that comes into contact with an upper surface 310 of the bearing 300. The third surface 210C is disposed on the upper inner diameter portion 212 and is a surface spaced apart from the outer circumferential surface of the outer ring of the bearing 300. The third surface 210C may be disposed between the first surface 210A and the second surface 210B in a height direction of the bracket 300.

After the caulking, the second surface 210B presses the upper surface 310 of the bearing 300 to fix the bearing 300. In addition, due to the third surface 210C, a gap as shown by S in FIG. 7 is secured. The gap S is configured to inhibit the bearing pocket part 210 from being deformed while the caulking is performed after the bearing 300 is received in the bearing pocket part 210. When performing the caulking, if the gap as shown by S in FIG. 7 is not secured, there is a great risk that the bearing pocket part 210 is deformed, and a pressure applied to the upper surface 310 of the bearing 300 becomes greater than a pressure applied to a lower portion of the bearing 300 so that annoying sounds may be easily generated. The bracket 200 of the housing 40 of the motor according to the embodiment secures the gap S through the second surface 210B so that when performing the caulking, the bearing pocket part 210 may be inhibited from being deformed, and it is possible to inhibit a pressure difference from becoming great between upper and lower portions of the bearing 300.

Figure 8:
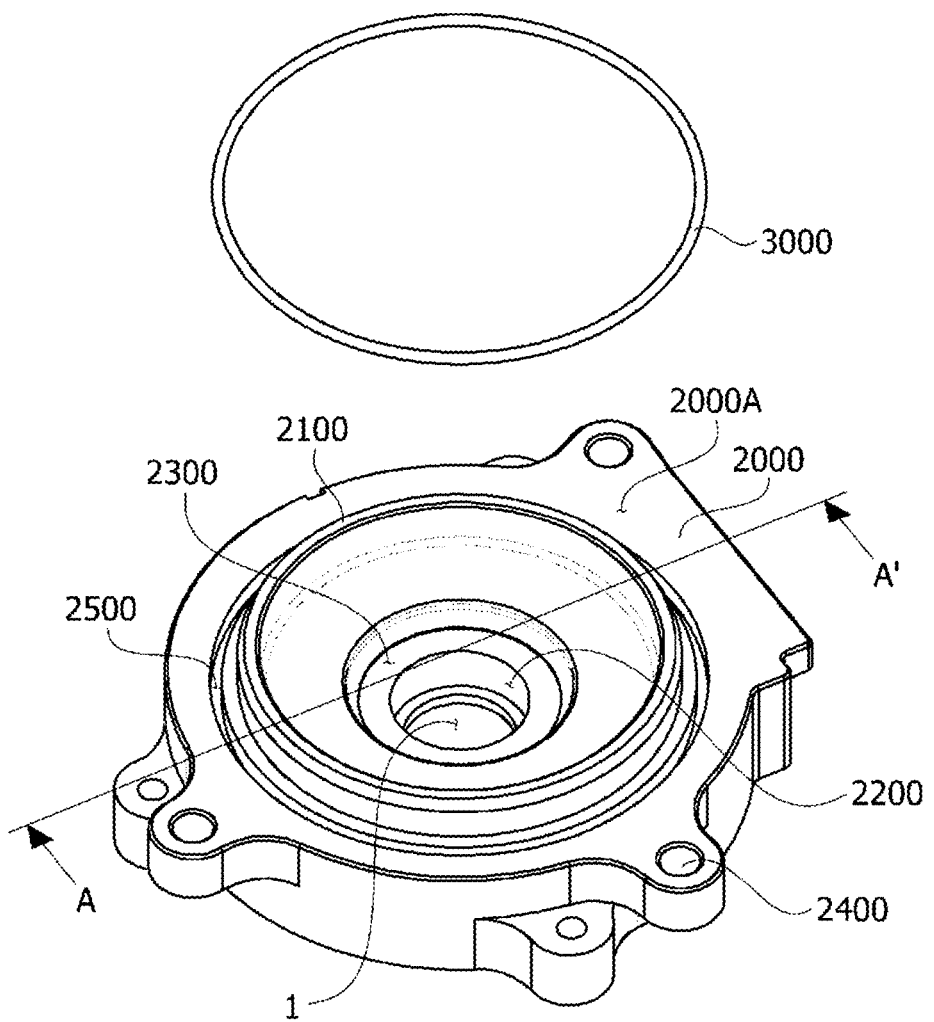
FIG. 8 is a view illustrating a bracket according to another embodiment.
Figure 9:
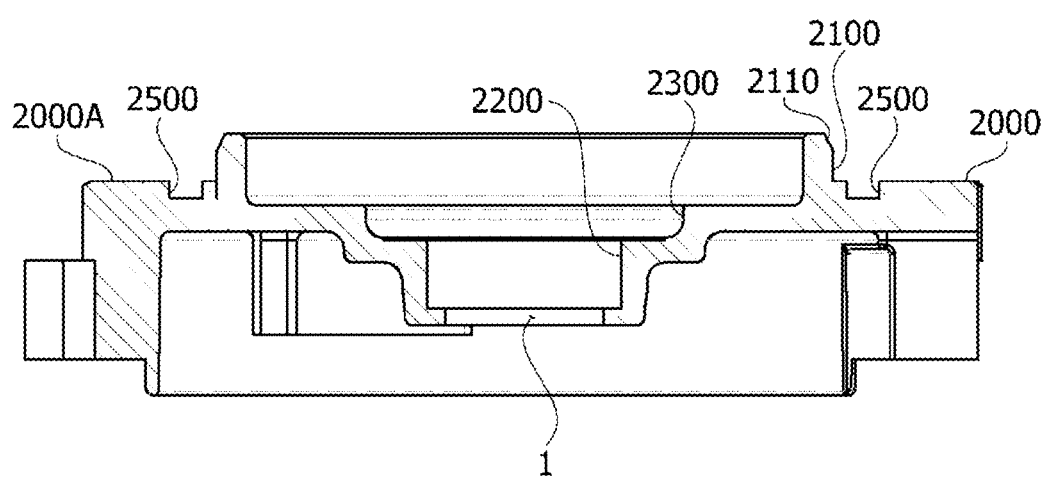
FIG. 9 is a sectional view of the bracket taken along line A-A' of FIG. 3.

FIG. 8 is a view illustrating a bracket according to another embodiment, and FIG. 9 is a sectional view of the bracket taken along line A-A' of FIG. 3.

Referring to FIGS. 8 and 9, a bracket 2000 may include a bearing pocket part 2200 configured to receive the bearing (300 in FIG. 1). A hole 1 may be disposed at a center of the bracket 2000, and the bearing pocket part 2200 may be disposed along a circumference of the hole 1. The bearing pocket part 2200 is recessed in an upper surface 2000A of the bracket 2000 and includes a space configured to receive the bearing (300 in FIG. 1).

The bracket 2000 may include a coupler pocket part 2300 configured to receive the coupler (70 in FIG. 2). The coupler pocket part 2300 is disposed on an upper side of the bearing pocket part 2200. An inner diameter of the coupler pocket part 2300 may be greater than an inner diameter of the bearing pocket part 2200. The coupler pocket part 2300 may be recessed in the upper surface 2000A of the bracket 2000.

The bracket 2000 may include a fastening part 2400. The fastening part 2400 is provided for physical coupling with a steering apparatus. The fastening part 2400 may be provided with a fastening hole 2410 through which a fastening member such as a bolt passes. The fastening part 2400 may extend and protrude from a side surface of the bracket 2000. A plurality of fastening parts 2400 may be provided.

When a motor is coupled with the steering apparatus, the upper surface 2000A of the bracket 2000 comes into contact with the steering apparatus. Therefore, when vibrations are generated in the steering apparatus, the generated vibrations are transmitted to the motor through the upper surface 2000A of the bracket 2000. In order to reduce the vibrations transmitted to the motor from the steering apparatus, a guide 2100 may protrude from the upper surface 2000A of the bracket 2000 according to the embodiment.

The guide 2100 is press-fitted into a coupling portion of the steering apparatus to increase coupling strength between the motor and the steering apparatus so that the vibrations may be inhibited from being generated due to a clearance of the fastening part 2400. The guide 2100 may be radially symmetrical about the hole 1 of the bracket 2000 on the upper surface 2000A of the bracket 2000. For example, the guide 2100 may be annularly disposed along a circumference of the hole 1 of the bracket 2000. Although an annular guide 2100 is shown in the drawing, a plurality of block-shaped guides 2100 may be provided.

An upper end of the guide 2100 may include an inclined surface 2110. In detail, an upper end of an outer circumferential surface of the guide 2100 may be cut to form the inclined surface 2110. The inclined surface 2110 is formed to facilitate the press-fitting into the coupling portion of the steering apparatus.

A damper 3000 may be disposed on the upper surface 2000A of the bracket 2000. The damper 3000 comes into contact with the coupling portion of the steering apparatus and serves to absorb the vibrations transmitted from the steering apparatus. The damper 3000 may be formed of a flexible material such as rubber.

Figure 10:
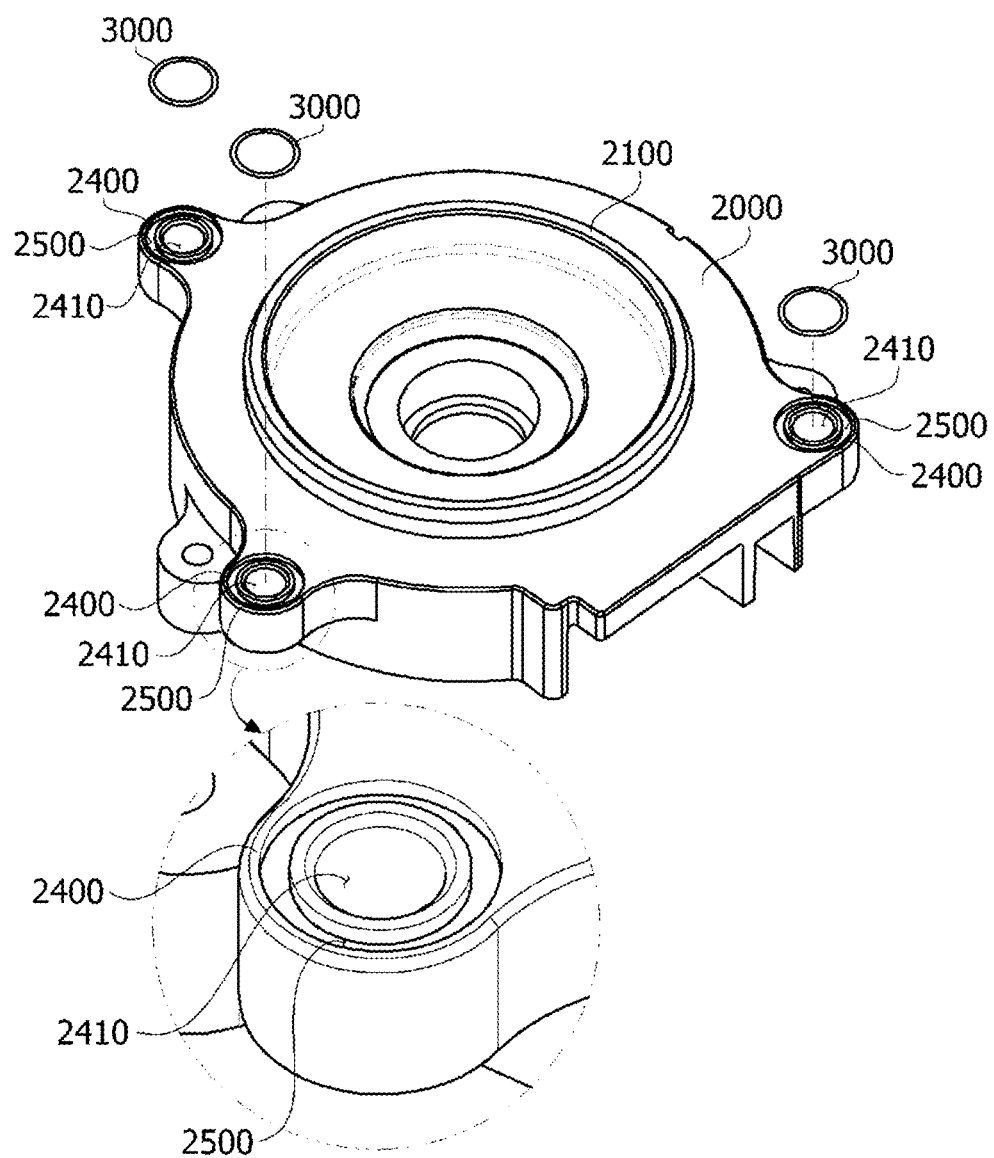
FIG. 10 is a view illustrating a bracket according to still another embodiment.

A groove 2500 into which the damper 3000 is inserted may be disposed in the upper surface 2000A of the bracket 2000. The groove 2500 may be recessed in the upper surface 2000A of the bracket 2000. The groove 2500 may be annularly arranged along an outer side of the guide 2100. When the damper 3000 is inserted into the groove 2500, an area of the damper 3000 protruding upward from the upper surface 2000A of the bracket 2000 comes into contact with the coupling portion of the steering apparatus. FIG. 10 is a view illustrating a bracket according to still another embodiment.

Referring to FIG. 10, a bracket 2000 may include a plurality of fastening parts 2400. The fastening part 2400 is a part that is coupled with a fastening part disposed in the steering apparatus. The fastening part 2400 may be provided with a fastening hole 2410 through which a fastening member such as a bolt passes at a center thereof.

A damper 3000 is disposed on the fastening part 2400. A groove 2500 may be disposed in an upper surface of the fastening part 2400. The groove 2500 is recessed in the upper surface of the fastening part 2400. In addition, the groove 2500 may be annularly arranged along an outer side of the fastening hole 2410. When the damper 3000 is inserted into the groove 2500, an area of the damper 3000 protruding upward from the upper surface of the fastening part 2400 comes into contact with the fastening part of the steering apparatus.

The dampers 3000 shown in FIGS. 8 and 10 are configured to enhance adhesion with a target object that comes into contact with the bracket 2000. When the adhesion with the target object is increased, foreign substances are inhibited from being introduced from an outside. Further, the damper 3000 serves to absorb the vibrations transmitted from the target object to inhibit noise from being generated. In addition, when screw-coupled to the fastening part 240, the adhesion may be insufficient due to tolerances. The damper 3000 may increase the adhesion to improve coupling strength.

Figure 11:
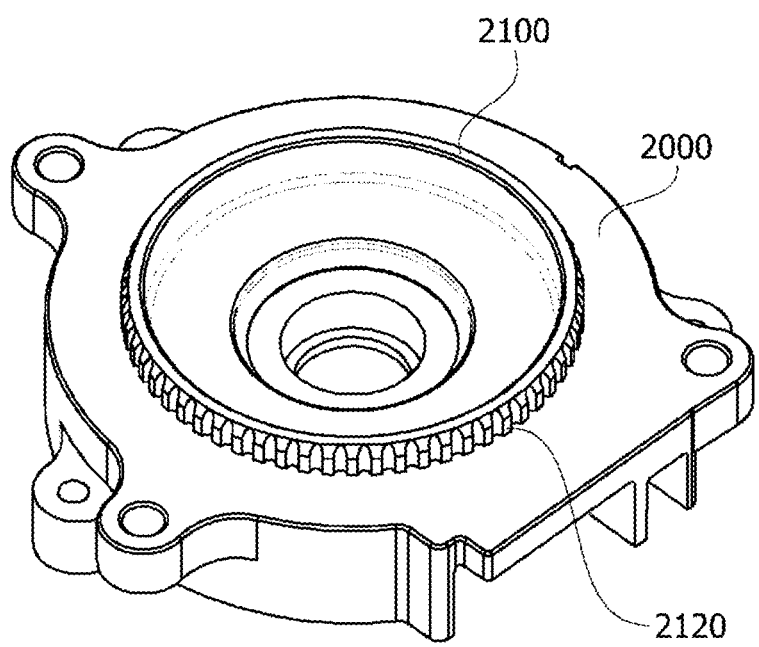
FIG. 11 is a view illustrating a bracket according to yet another embodiment.

FIG. 11 is a view illustrating a bracket according to yet another embodiment.

Referring to FIG. 11, a bracket 2000 may include a concavo-convex portion 2120 disposed on an outer circumferential surface of a guide 2100. The concavo-convex portion 2120 may be arranged along the outer circumferential surface of the guide 2100 in a sawtooth shape. The concavo-convex portion 2120 serves to reduce a contact area with a coupling portion of a steering apparatus, thereby reducing transmission of the vibrations generated in the steering apparatus to the motor.

Figure 12:
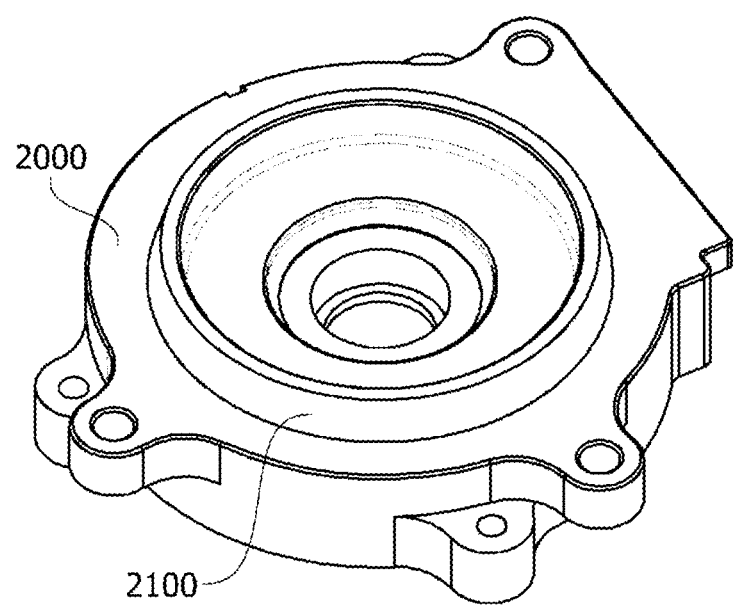
FIG. 12 is a view illustrating a bracket according to still yet another embodiment.
Figure 13:
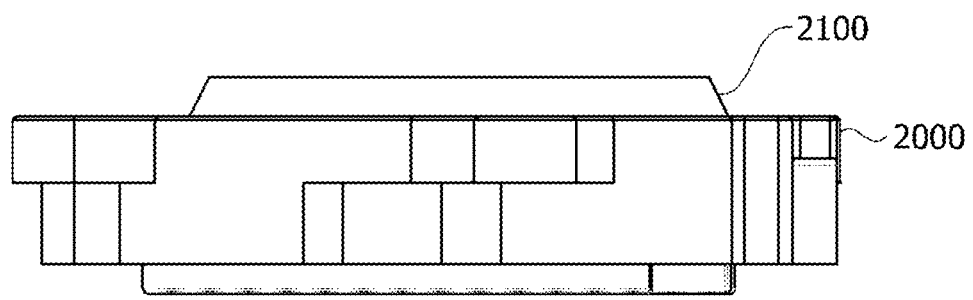
FIG. 13 is a side view of the bracket shown in FIG. 12.

FIG. 12 is a view illustrating a bracket according to still yet another embodiment, and FIG. 13 is a side view of the bracket shown in FIG. 12.

Referring to FIGS. 12 and 13, a bracket 2000 may include a guide 2100 which has a tapered shape having an outer diameter gradually decreased upward. The guide 2100 having a tapered shape is a configuration provided to minimize a contact area with a coupling portion of a steering apparatus.

As described above, the motor according to one exemplary embodiment of the present invention has been specifically described with reference to the accompanying drawings.

The technical idea of the present invention has been described above for illustrative purposes, and it will be understood by those of ordinary skill in the art to which the invention pertains that various changes, modifications, and substitutions may be made without departing from essential characteristics of the present invention. Therefore, the embodiments of the present invention and the accompanying drawings are intended to illustrate and not to limit the technical idea of the present invention, and the scope of the technical idea of the present invention is not limited by the embodiments and the accompanying drawings. The scope of the present invention should be construed according to the appended claims, and all technical ideas within the scope of equivalents thereof should be construed as falling within the scope of the present invention.

The invention claimed is:

1. A motor comprising:
   a rotation shaft;
   a rotor including a coupling hole in which the rotation shaft is disposed;
   a stator disposed outside the rotor; and
   a housing configured to receive the rotor and the stator, wherein the housing includes a body and a bracket disposed on one side of the body, wherein the bracket includes a hole through which the rotation shaft passes, a bearing pocket part disposed along a circumferential direction about a center of the hole, and a bearing disposed in the bearing pocket part, wherein an uppermost surface of the bearing is exposed through the hole in the bracket, wherein an inner surface of the bearing pocket part includes a first surface, a second surface, and a third surface, the second surface being perpendicular to the first surface and the third surface, wherein the first surface is in direct physical contact with an outer circumferential surface of the bearing, wherein at least a portion of the second surface is in direct physical contact with the uppermost surface of the bearing, wherein the third surface is disposed between the first surface and the second surface in a height direction of the bracket while being spaced apart from the outer circumferential surface of the bearing, wherein a gap is formed between the third surface and the bearing and the second surface is exposed to the gap, and wherein a lower surface of the bearing pocket part is in contact with a lower surface of the bearing.

2. The motor of claim 1, wherein the bearing pocket part includes a lower inner diameter portion connected to a lower surface of the bearing pocket part, and an upper inner diameter portion connected to an upper surface of the bearing pocket part and having an inner diameter greater than an inner diameter of the lower inner diameter portion, and a sum of a height of the lower inner diameter portion and a height of the upper inner diameter portion is greater than a height of the bearing based on the lower surface of the bearing pocket part and is smaller than a height of the upper surface of the bearing pocket part based on the lower surface of the bearing pocket part.

3. The motor of claim 1, wherein the second surface is connected to the third surface.

4. The motor of claim 3, wherein
the first surface is connected to a lower surface of the bearing pocket portion.

5. The motor of claim 1, wherein the bracket includes a guide protruding from an upper surface of the bracket and disposed to be radially symmetrical about the center of the hole.

6. The motor of claim 1, wherein the bracket includes a guide protruding from an upper surface of the bracket and disposed to be radially symmetrical about the hole, the guide protruding away from the upper surface of the bracket in a first direction parallel to the rotation shaft.

7. The motor of claim 6, wherein the guide is annularly disposed along a circumferential direction about a center of the hole.

8. The motor of claim 6, wherein the concave groove is disposed in the upper surface of the bracket annularly around the guide, and
wherein the bracket includes a damper disposed in the groove.

9. The motor of claim 6, wherein the guide includes a concavo-convex portion disposed along an outer circumferential surface of the guide.

10. The motor of claim 6, comprising a sensing magnet coupled to the rotation shaft and configured to detect a position of the rotor.

11. The motor of claim 10, comprising a printed circuit board comprising a sensor disposed thereon, the sensor being configured to detect a magnetic force of the sensing magnet.

12. The motor of claim 11, the sensor being a Hall integrated circuit.

13. The motor of claim 1, comprising a sensing magnet coupled to the rotation shaft and configured to detect a position of the rotor.

14. The motor of claim 13, comprising a printed circuit board comprising a sensor disposed thereon, the sensor being configured to detect a magnetic force of the sensing magnet.

15. The motor of claim 14, the sensor being a Hall integrated circuit.

16. A motor comprising:
a rotation shaft;
a rotor including a hole in which the rotation shaft is disposed;
a stator disposed outside the rotor; and
a housing configured to receive the rotor and the stator,
wherein the housing includes a body and a bracket configured to cover the body and including a hole at a center thereof,
the bracket includes a guide protruding from an upper surface of the bracket and disposed to be radially symmetrical about the hole, the guide protruding away from the upper surface of the bracket in a first direction parallel to the rotation shaft,
wherein a width of the guide, measured in a radial direction perpendicular to the rotation shaft, is constant around an entire circumference of the guide,
wherein the guide comprises an inclined surface disposed at an upper end of the guide, the inclined surface being included around the entire circumference of the guide,
wherein the bracket includes a concave groove disposed in the upper surface of the bracket, the concave groove including a bottom surface that faces the first direction,
wherein the bracket includes a bearing pocket part disposed along a circumferential direction about a center of the hole, and a bearing disposed in the bearing pocket part,
wherein an uppermost surface of the bearing is exposed through the hole in the bracket,
wherein an inner surface of the bearing pocket part includes a first surface, a second surface, and a third surface, the second surface being perpendicular to the first surface and the third surface,
wherein the first surface is in direct physical contact with an outer circumferential surface of the bearing,
wherein at least a portion of the second surface is in direct physical contact with the uppermost surface of the bearing,
wherein the third surface is disposed between the first surface and the second surface in a height direction of the bracket while being spaced apart from the outer circumferential surface of the bearing,
wherein a gap is formed between the third surface and the bearing and the second surface is exposed to the gap, and
wherein a lower surface of the bearing pocket part is in contact with a lower surface of the bearing.

* * * * *